United States Patent
Higgs et al.

(10) Patent No.: US 6,848,679 B2
(45) Date of Patent: Feb. 1, 2005

(54) CONNECTOR FOR A MODULAR SAFETY RAIL

(75) Inventors: Philip Maurice Higgs, Berkshire (GB); Charles William Stratford Presant, Berkshire (GB)

(73) Assignee: Kee Klamp Limited, Berkshire (GB)

( * ) Notice: Subject to any disclaimer, the term of this patent is extended or adjusted under 35 U.S.C. 154(b) by 0 days.

(21) Appl. No.: 10/242,635

(22) Filed: Sep. 13, 2002

(65) Prior Publication Data

US 2003/0094604 A1 May 22, 2003

(30) Foreign Application Priority Data

Sep. 13, 2001 (GB) .............................................. 0122128

(51) Int. Cl.⁷ .............................................. E04G 21/32
(52) U.S. Cl. .................................... 256/65.14; 403/205
(58) Field of Search .................. 285/179, 64; 248/314, 248/220.1, 534, 536, 535, 512, 237; 403/403, 382, 187, 188, 205, 206, 362; 52/655.1, 653.2; 256/59, 65.16, 65.14, 65.01–65.05, DIG. 6, 65.08; 182/82

(56) References Cited

U.S. PATENT DOCUMENTS

| | | | | |
|---|---|---|---|---|
| 435,156 A | * | 8/1890 | Schmemann | 52/86 |
| 1,053,255 A | * | 2/1913 | Ward | 248/536 |
| 1,950,947 A | * | 3/1934 | Mulroyan | 285/148.22 |
| 2,711,917 A | | 6/1955 | Blu | |
| 3,342,457 A | * | 9/1967 | Bobrowski | 256/21 |
| 3,420,558 A | * | 1/1969 | Whitten, Jr. | 403/24 |
| 3,462,021 A | * | 8/1969 | Hawke et al. | 211/182 |
| 3,776,521 A | * | 12/1973 | Weinert | 256/24 |
| 5,188,342 A | * | 2/1993 | Ouellette et al. | 256/65.08 |
| 6,053,281 A | * | 4/2000 | Murray | 182/113 |
| 6,467,230 B1 | * | 10/2002 | Perkins et al. | 52/655.1 |

FOREIGN PATENT DOCUMENTS

| | | |
|---|---|---|
| CA | 1 002 410 A | 12/1976 |
| DE | 298 12 547 U1 | 10/1998 |
| GB | 619923 | 3/1949 |
| GB | 2 293 402 A | 3/1996 |
| GB | 2 316 121 A | 2/1998 |

* cited by examiner

Primary Examiner—James R. Brittain
(74) Attorney, Agent, or Firm—Young & Thompson

(57) ABSTRACT

A connector for a modular safety rail comprises a unitary combination of a body portion and two socket formations. The body portion comprises first and second flange formations which each define a substantially planar support surface, the support surfaces lying substantially perpendicular relative to one another in an 'L' shape configuration as viewed along the line of intersection of the support surfaces. The support surfaces facing outwardly, and opposite inwardly facing surfaces of the flange formations each have integral therewith a respective one of the socket formations. Each socket formation has an outer end for receiving a tube or rod and an inner end region which is integral with the inner end region of the other socket formation of the pair, the longitudinal axis of each socket formation extending substantially perpendicular to the line of intersection of the support surfaces.

24 Claims, 6 Drawing Sheets

CONNECTOR FOR A MODULAR SAFETY RAIL

BACKGROUND OF THE INVENTION

This invention relates to a connector for a modular type safety rail assembly and in particular, though not exclusively, to a connector and to a modular safety rail assembly suitable for use in providing free-standing roof edge protection.

Modular type safety rail systems are well known and typically comprise straight lengths of metal tubing interconnected by connectors of different types such that, for example, two, three or four way interconnections of horizontally and vertically extending tubes may be achieved.

Tubes serving as vertical posts of a safety rail, and relative to which horizontally extending tubes are connected, are supported by metal base plates which typically are of a rectangular shape and, in use, rest on the surface of a roof. An annular flange of a mounting socket typically is bolted to an upper surface of the base plate, adjacent to one of the shorter edges of the rectangular shape, to provide location for the lower end of a vertical post.

The ability of the free-standing safety rail to avoid toppling when leant on may be achieved by a counter balance weight secured to the end of a spacer tube which, in use, extends horizontally over the roof surface and is secured rigidly to the base plate. This arrangement is particularly suitable if it is not possible or convenient to position a spacer bar to act as a stabiliser member which extends forwards, horizontally, in the direction of potential toppling.

If, however, space permits, a spacer tube may be arranged to extend forwards in the direction of potential toppling so as to act as a stabiliser bar. Optionally in that case the distal end of the stabiliser bar may be provided with a counter balance weight.

Conventionally the horizontal spacer tube is rigidly secured to the base plate by being received firmly in a horizontally extending sleeve having a base flange which is bolted to the upper surface of the plate, with the major axis of the sleeve being parallel with the length dimension of the plate.

The aforedescribed known connector construction is reliable and easy to install. However, production of the connector requires many manufacturing and assembly operations, which involves time and expense.

SUMMARY OF THE INVENTION

The present invention seeks to provide a connector for a modular safety rail assembly which facilitates production at a lower cost.

In accordance with one aspect of the present invention a connector for a safety rail assembly comprises a unitary component comprising a body portion and a pair of socket formations, said body portion comprising first and second flange formations which each define a substantially planar support surface and said support surfaces lying substantially perpendicular relative to one another in an 'L' shape configuration as viewed in the direction of the line of intersection of said planar support surfaces, said support surfaces facing outwardly, and opposite inwardly facing surfaces of the flange formations each having integral therewith a respective one of said socket formations, each socket formation having an outer end for receiving an end of a tube or rod and an inner end region which is integral with the inner end region of the other socket formation of the pair, the longitudinal axis of each socket formation extending substantially perpendicular to said line of intersection of said planar support surfaces.

The angle at which the axes of the socket formations extend relative to one another may be equal to the angle at which said substantially planar support surfaces lie relative to one another. That angle may be 90° or may depart therefrom and may lie in the range 70° to 95°, and more preferably 75° to 90°.

In an alternative configuration the socket formations may extend relative to one another at an angle which is less than the angle between said substantially planar surfaces. That angle difference may be in the range 0° to 20°, preferably 0° to 15°.

One socket formation may have the axis thereof parallel with one support surface and the other socket formation may have the axis thereof inclined to the other of said support surfaces. Alternatively both socket formations may have the axes thereof inclined to the associated support surface. An integrally formed support web may be provided between a flange formation and that socket formation which is inclined relative thereto.

One flange formation may be provided with an aperture that extends from the outwardly facing substantially planar support surface and communicates with the bore defined by the socket formation associated with the other of the flange formations. That apertured flange formation preferably is arranged in use to extend generally horizontally.

The other flange formation, being that intended in use to lie with the support surface thereof substantially vertical, may be provided with at least one location aperture the respective ends of which are accessible externally of the socket formation whereby the aperture may be used to locate a retainer, such as a nut and bolt assembly, for securing a safety plinth to the connector. Preferably a pair of location apertures are provided and disposed symmetrically relative to the associated socket formation.

In a connector in which a socket formation lies inclined to the associated flange formation, preferably the or each said location aperture is provided in said associated flange formation.

The bore defined by one of the socket formations may be in communication with that bore defined by the other socket formation and one of the socket formations may be provided with an internal abutment to prevent a tube or rod received by one socket formation entering into space which is intended to be occupied by a tube or rod received in other socket formation.

Each or only one of the socket formations may have a bore of substantially uniform cross-sectional shape, eg circular, along the length of the bore. Each or only one of the socket formations, typically at least that intended to support a substantially vertically extending rod or tube, may be of circular cross-sectional shape at the outer end thereof, and of increasingly elliptical shape ( or "other shape", preferably a non-circular shape) as considered in an inwards direction from said outer end to an inner end region, thereby to allow for a small variation of the angle of tilt of an inserted rod or tube. The major axis of said elliptical type shape preferably extends in a direction substantially perpendicular to the line of intersection of the substantially planar support surfaces. Said elliptical or said other shape may have a length, as considered in a direction parallel with the line of intersection of the planar support surfaces, which equals the corresponding dimension at said outer end of the socket whereby tilt about an axis perpendicular to said line of intersection is inhibited. The shaping of the bore(s) may be arranged to allow tilt in a range up to at least 10°, typically up to 5°.

In the case of a socket formation which allows a rod or tube to be held slightly inclined, for example in the aforementioned range of up to 20° relative to one of the substantially planar support surfaces, the associated flange formation may be of a locally reduced thickness at an inner end region of that socket formation. The region of locally reduced thickness may be shaped to accommodate part of the end of a rod or tube inserted into that socket formation.

Each socket formation preferably comprises means for enabling a rod or tube to be retained axially. One or each socket formation may comprise a screw threaded aperture which, for example, is adapted to receive a grub screw which can be tightened against and thereby provide axial location for an inserted rod or tube. A socket formation may comprise more than one means for retaining a rod or tube. In the case of a socket formation which enables an inserted rod or tube to be adjusted in angle of tilt, eg a socket formation which comprises an elliptical cross-sectional shape, two retention means may be provided at spaced positions (typically axially spaced positions) to allow an inserted member to be locked at a selected angle of tilt.

The vertical socket may have a length to diameter ratio greater than that commonly employed for connector devices of the type to which this invention relates. The invention teaches that optionally said length to diameter ratio may be least 1.5:1, for example 2:1 or more. A ratio greater than 3:1 is not excluded. The vertical socket may have a length greater than that of the horizontal socket. The greater length of the vertical socket has the advantage for some applications of permitting height adjustment of a vertical post or rod such that, despite localised undulations in a roof surface, a horizontal rail supported by the tops of the posts or rods will be able to follow a straight line. The conventional need for on-site cutting to length of vertical rods or tubes is thus avoided. Means by which a rod or tube is retained in the vertical socket preferably is provided in the outer half of the length of the socket so as to be able firmly to retain a rod or tube even though the lower end of the rod or tube is spaced slightly above the base of that socket.

To assist in resisting toppling of the connector unit and an inserted vertical rod or tube during the assembly stage, before horizontal interconnections are in place, the connector may have a width which is at least equal to the vertical height of the connector. The invention envisages typically a width to height ratio in the range 1:1 to 2:1, but a greater ratio is not excluded. A ratio of 1.5:1 may be appropriate for many applications.

The unitary component comprised of said body portion and pair of socket formations may be a cast component, eg aluminium or iron, which may be galvanised, or may be moulded from plastics material.

BRIEF DESCRIPTION OF THE DRAWINGS

Two embodiments of the present invention will now be described, by way of example only, with reference to the accompanying drawings in which.

DETAILED DESCRIPTION OF THE PREFERRED EMBODIMENTS

Figure 1:
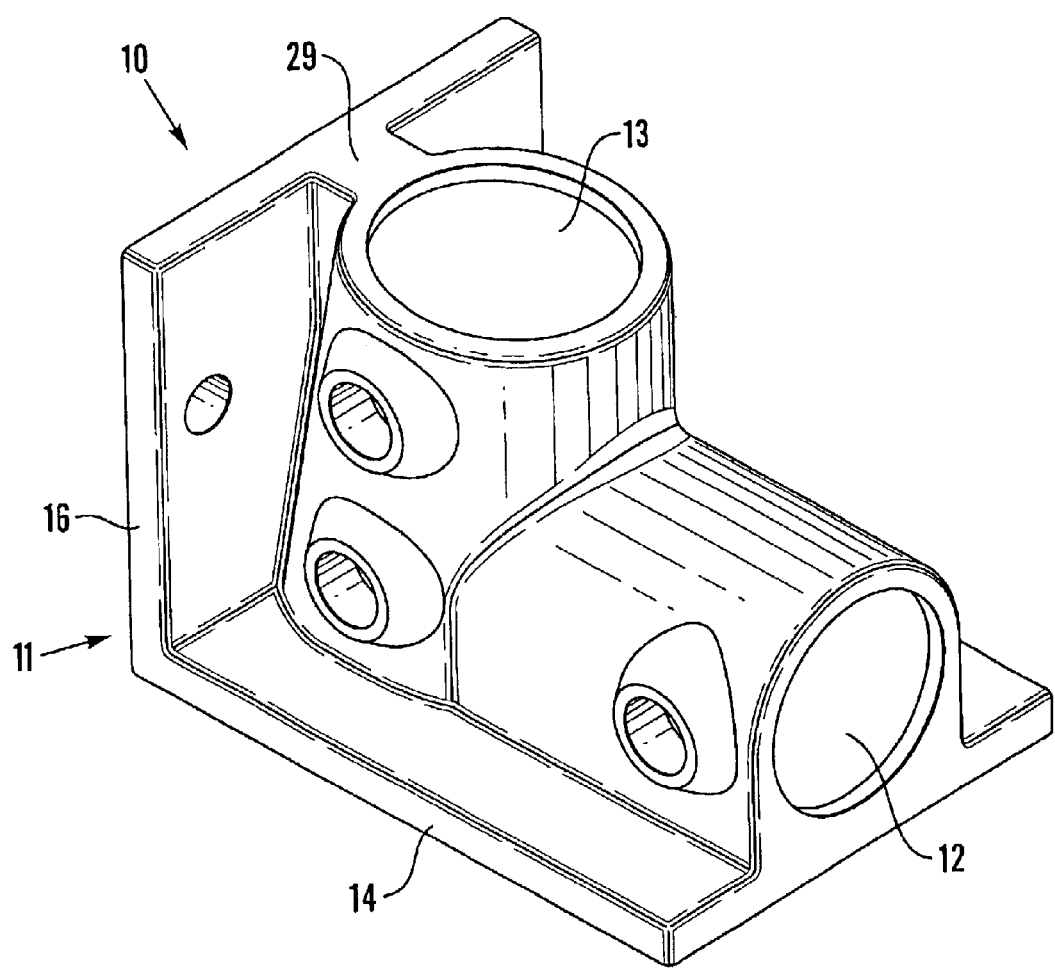
FIG. 1 is a perspective view of a connector in accordance with the present invention.

A connector (10) for use as a base connector of a modular safety rail assembly comprises an integral construction of a body portion (11) and two socket formations (12, 13) said integral construction being formed from malleable cast iron.

The body portion (11) comprises a first flange formation (14) which is a base flange that in use lies generally horizontally and has an outer, downwardly facing, substantially flat surface (15). The body portion (11) additionally comprises a second flange formation (16) which in use has an outwardly facing and substantially vertical support surface (17) to which a safety plinth may be secured.

Figure 3:
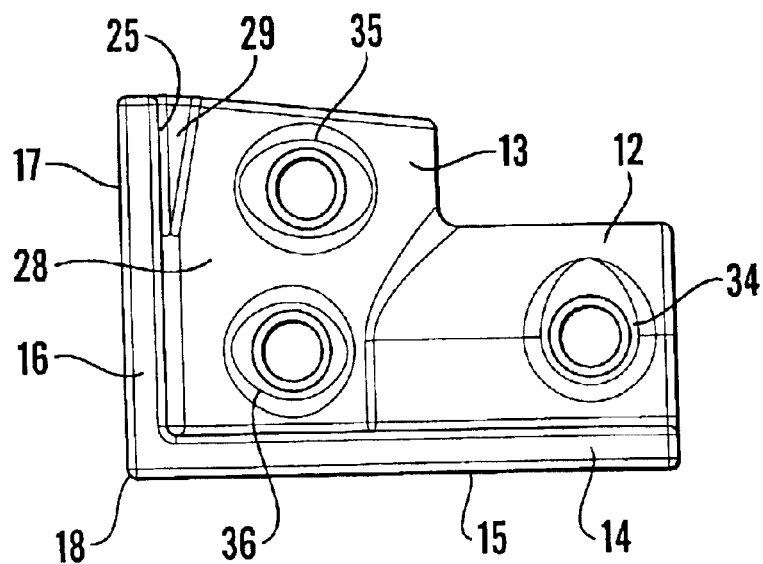
FIG. 3 is a side view of the connector of FIG. 1.
Figure 4:
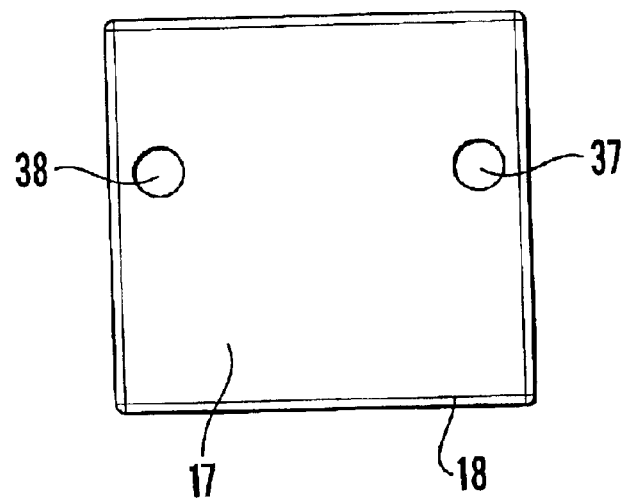
FIGS. 4 & 5 are respective end views of the connector of FIG. 1.
Figure 5:
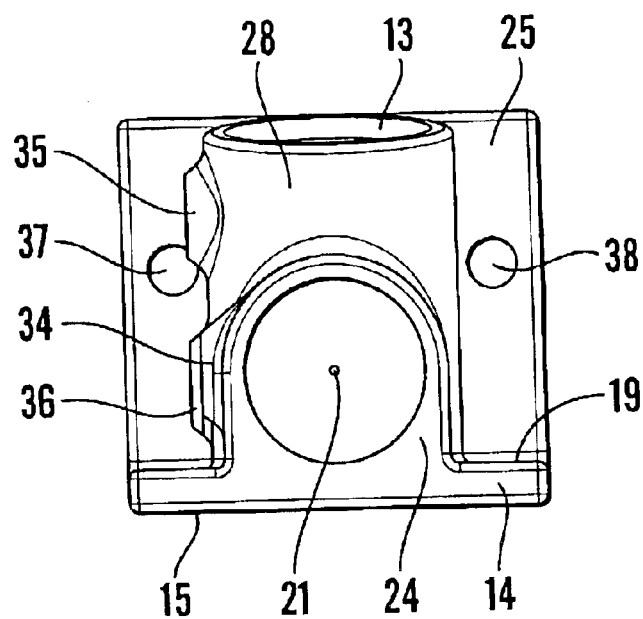
Figure 7:
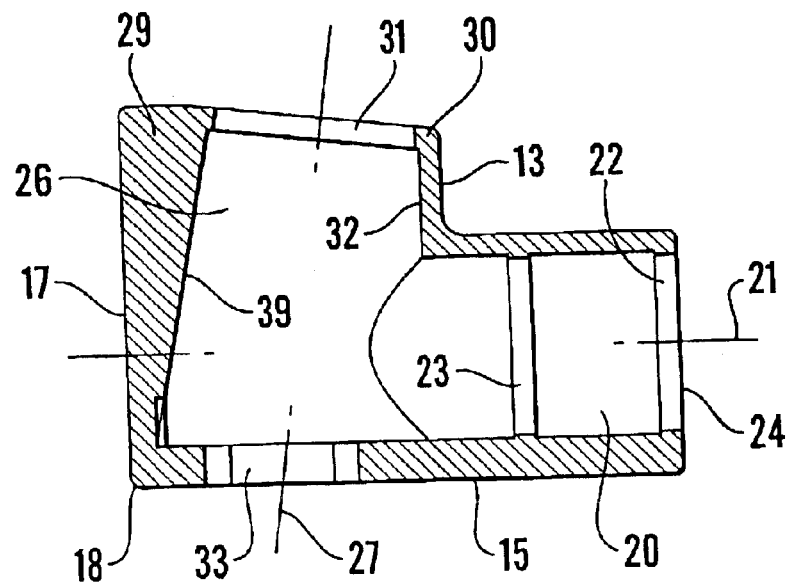
FIG. 7 is a section on the line XX of FIG. 2.

The aforementioned outer facing surfaces (15, 17) lie substantially at right angles to one another and intersect linearly at edge (18) to present an L shape as viewed from the side in FIGS. 3 and 7.

The inwardly facing surface (19) of the base flange (14) has a socket formation (12) formed integrally therewith. The socket formation (see FIG. 7) defines a cylindrical bore (20) the longitudinal axis (21) of which extends parallel with the surface (15) and perpendicular to the edge (18). The bore (20) is formed with two location rings (22, 23) of a diameter slightly less than the remainder of the length of the bore (20), one (22) at the outer end (24) of the socket and the other (23) at an inwards position. The diameter of the rings is slightly greater than the outer diameter of the horizontal tube intended to be received in the socket (12).

The inwardly facing surface (25) of the support flange (16) has a socket formation (13) formed integrally therewith. The socket formation defines a bore (26) the longitudinal axis (27) of which extends inclined at an angle of 5.5° relative to the flange outer face (17), but perpendicular relative to the edge (18). The socket formation (13) has a generally curved outer surface (28), and a support web (29) extends integrally between that surface (28) and the flange surface (25) to provide a structural interconnection therebetween.

Figure 2:
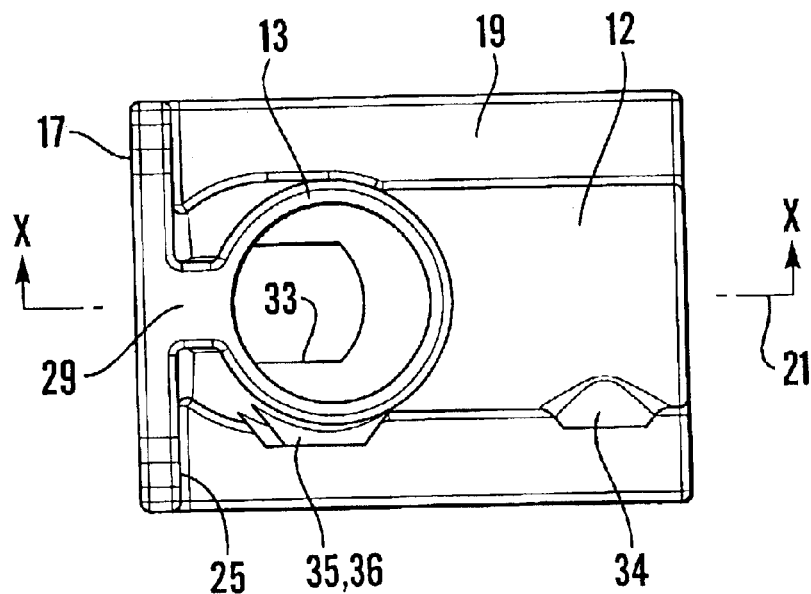
FIG. 2 is a plan view of the connector of FIG. 1.

The socket formation (13) has at the outer end (30) thereof a circular location ring (31) substantially corresponding to the ring (22) of the other socket, but of a larger diameter. The bore (26) however is not of uniform cross-sectional shape along the length thereof. It is of a constant maximum width as considered in the direction of the length of intersection edge (18) but increases in dimension, with an elliptical cross-sectional shape in a direction inwards from the outer end (30). The major axis of the elliptical shape lies parallel with the axis (21) of the other socket formation (12) as considered in plan as viewed in FIG. 2. The surface region (32) of the bore (26) furthest from the support face (17) in parallel with that support face as viewed in FIG. 7, whilst the surface region (39) of the bore nearest support face (17) is inclined at an angle of 11° relative thereto. In consequence a tube inserted into the socket formation (13) can be tilted to lie with the longitudinal axis of the tube within the angle range 0° to 11° relative to the support face (17).

Figure 6:
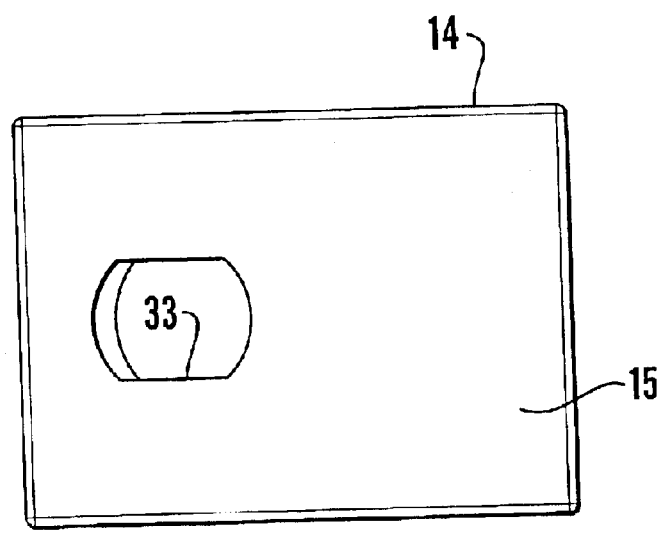
FIG. 6 is a view of the underneath of the connector of FIG. 1.

The bores (20, 26) of the two socket formations are in communication with one another at their inner end regions. The base flange (14) has an aperture (33) at a position aligned substantially with the axis (27) of the second socket formation (13), Aperture (33) is of an elongate shape as shown in FIG. 6 and can serve to provide drainage and/or adjustable location for retention means in the case of a supporting ground or roof surface which permits the connector (10) to be secured thereto.

The horizontal socket formation (12) is formed with an annular boss (34) and screw-threaded aperture at a position which lies axially substantially mid-way between the location rings (22, 23). A grub screw (not shown) is employed in the aperture to engage on the wall of an inserted horizontal spacer tube which is thereby secured in position.

The vertical socket formation (13) is formed with two annular boss formations (35, 36) at positions spaced axially from one another and from the outer end (30) of the socket. Each boss formation surrounds a screw-threaded aperture, and grub screws provided in said apertures enable an inserted rod or tube to be secured in position at the desired angle of inclination within the aforedescribed range of 0° to 11° relative to the support face (17).

The vertical flange (16) is provided with a pair of symmetrically disposed through-bores (37, 38) to enable a safety plinth to be bolted thereto.

Figure 8:
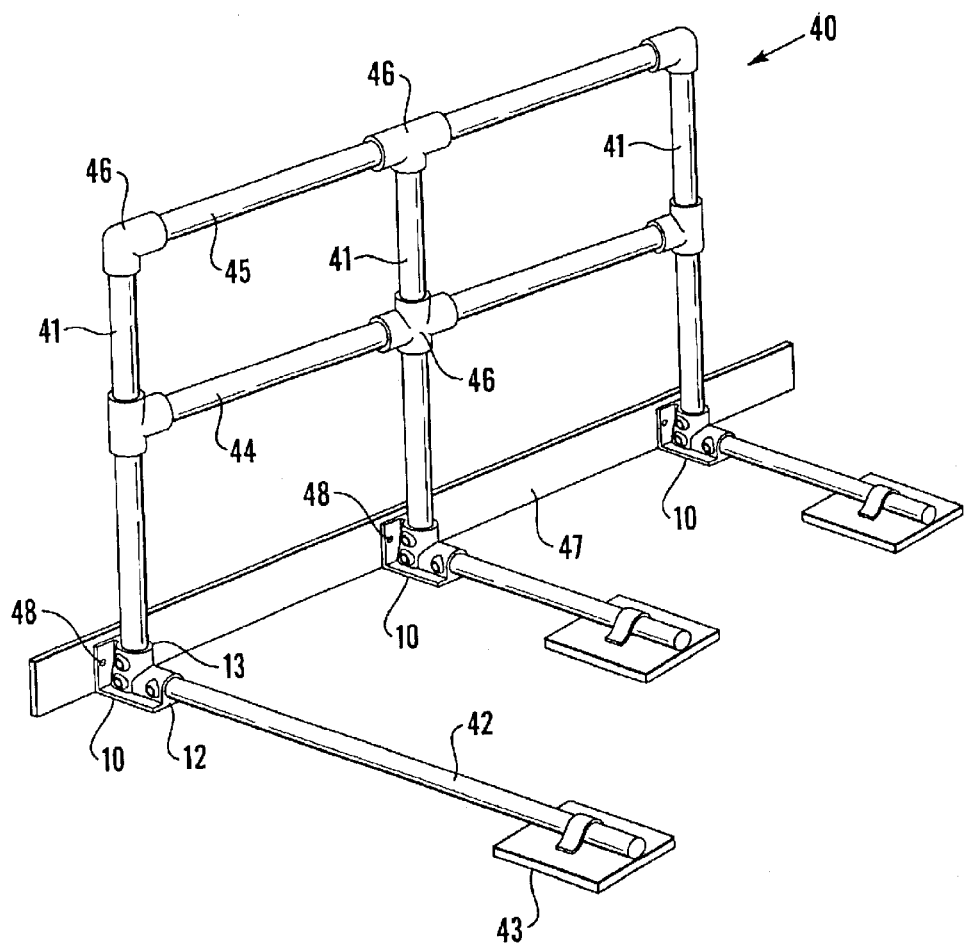
FIG. 8 is a perspective view of a modular safety rail assembly incorporating the connector of FIG. 1, and FIGS. 9 and 10 are views, corresponding in direction substantially with those of FIGS. 2 and 3, of a connector in accordance with another embodiment of the invention.

A short length of modular safety rail assembly (40) incorporating said base connectors (10) is shown in FIG. 8. The assembly comprises vertical posts (41) secured in the vertical sockets (13), horizontal spacer bars (42) secured in the horizontal sockets (12), counter-balance weights (43) at the other end of each spacer bar (42) and horizontal intermediate and top spacer rails (44, 45). The posts and rails are interconnected by connectors (46) in known manner. A safety plinth (47) is secured by bolts (48) to the vertical face (17) of each of the base connectors (10).

Figure 9:
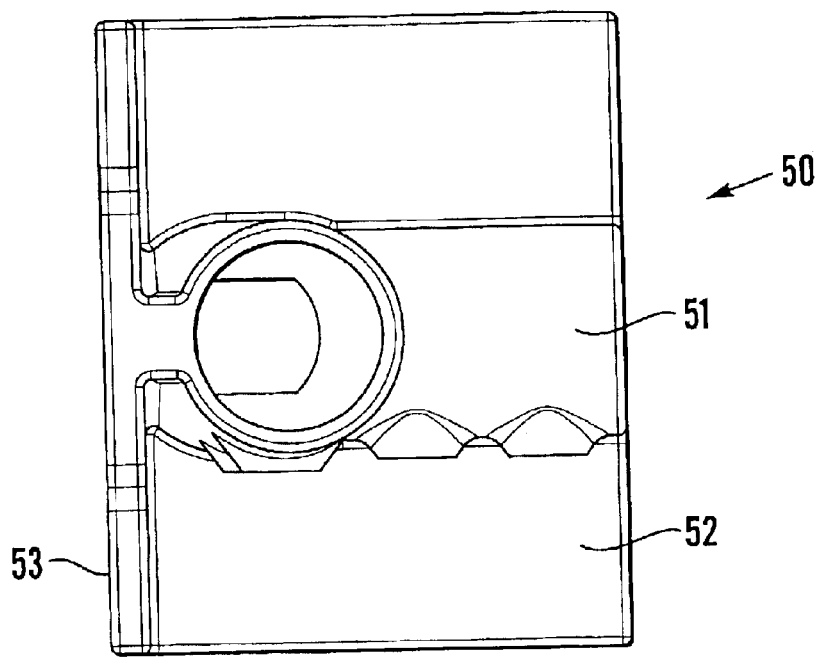
Figure 10:
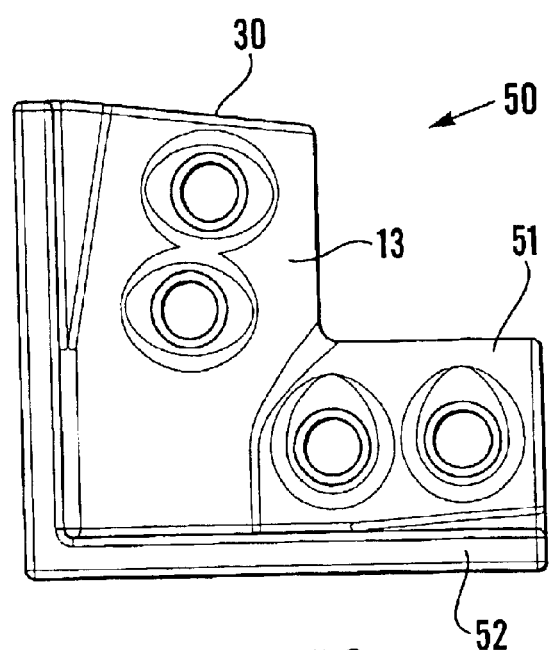

In the aforedescribed embodiment only the vertical socket allows for tilting movement. In a second embodiment, see FIGS. 9 and 10, a connector (50) has a horizontal socket (51) that allows for tilt in the same manner as the above described vertical socket (13), in this case at an angle of up to 10°. In consequence, whilst the connector may be positioned with the flange (52) on a level, horizontal gutter area of a roof, a horizontal spacer bar for a counter balance weight can extend inclined to the horizontal at an angle equal to the drainage run-off angle of the neighbouring roof area. The facility for horizontal adjustment is of benefit also for accommodating unevenness in a roof surface as typically may arise in the case of older buildings. Other distinguishing features of the second embodiment are that the vertical socket has a length twice the diameter of the outer end (30) and that the width of the connector, being the length of the edge (53), is twice the height of the connector.

What is claim is:

1. A connector for a safety rail assembly, said connector comprising a unitary casting comprising a body portion and a pair of socket formations, said body portion comprising first and second flange formations which each define a substantially planar support surface and said support surfaces lying relative to one another in an 'L' shape configuration at an included angle of 70° to 95° as viewed in the direction of the line of intersection of said planar support surfaces, said support surfaces facing outwardly, and opposite inwardly facing surfaces of the flange formations each having integral therewith a respective one of said socket formations so that each said flange formation and a respective one of said socket formations provide mutual support, each said socket formation having an outer end for receiving an end of a tube or rod and an inner end region which is integral with the inner end region of the other socket formation of the pair, the longitudinal axis of each said socket formation extending substantially perpendicular to said line of intersection of said planar support surfaces, and each said socket formation having at least one screw-threaded aperture for enabling, in use, an inserted rod or tube to be retained axially relative to the respective said socket formation.

2. A connector according to claim 1, wherein said socket formations extend relative to one another at an angle which is less than the angle between said substantially planar surfaces.

3. A connector according to claim 2, wherein said angle difference is less than 20°.

4. A connector according to claim 3, wherein said angle difference is less than 15°.

5. A connector according to claim 2, wherein at least one socket formation has the axis thereof inclined to one of said support surfaces.

6. A connector according to claim 5, wherein an integrally formed support web is provided between a flange formation and a socket formation which is inclined relative thereto.

7. A connector according to claim 5, wherein one socket formation has the axis thereof parallel with a support surface.

8. A connector according to claim 1, wherein the axes of the socket formations extend relative to one another at an angle which is equal to the angle at which said substantially planar support surfaces lie relative to one another.

9. A connector according to claim 1, wherein said support surfaces lie substantially perpendicular to each other.

10. A connector according to claim 1, wherein said included angle is in the range 75° to 90°.

11. A connector according to claim 1, wherein a flange formation is provided with at least one location aperture the respective ends of which are accessible externally of the socket formation.

12. A connector according to claim 11, wherein said flange formation comprises a pair of location apertures disposed symmetrically relative to the associated socket formation.

13. A connector according to claim 1, wherein the bore defined by one of the socket formations is in communication with that bore defined by the other socket formation and at least one of the socket formations is provided with an internal abutment to prevent a tube or rod received by said one socket formation entering into space intended to be occupied by a tube or rod received in the other socket formation.

14. A connector according to claim 1, wherein at least one socket formation is of non-circular cross-sectional shape over at least part of the axial length thereof.

15. A connector according to claim 14, wherein said at least one socket formation has a circular cross-sectional shape at the outer end thereof.

16. A connector according to claim 14, wherein the bore of said socket formation is of increasing elliptical shape as considered in an inwards direction from said outer end to an inner end region.

17. A connector according to claim 1, wherein at least one socket formation enables an inserted rod or tube to be adjusted in angle of tilt.

18. A connector according to claim 17, wherein said at least one socket formation comprises two retention means to allow the inserted member to be locked at a selected angle of tilt.

19. A connector according to claim 18, wherein said two retention means are provided at positions in the axially outer half of the length of the socket formation.

20. A connector for a safety rail assembly, said connector comprising a unitary casting comprising a body portion and a pair of socket formations, said body portion comprising first and second flange formations which each define a substantially planar support surface and said support surfaces lying relative to one another in an 'L' shape configuration at an included angle of 70° to 95° as viewed in the direction of the line of intersection of said planar support surfaces, said support surfaces facing outwardly, and opposite inwardly facing surfaces of the flange formations each having integral therewith a respective one of said socket formations, each said socket formation having an outer end for receiving an end of a tube or rod and an inner end region which is integral with the inner end region of the other socket formation of the pair, the longitudinal axis of each said socket formation extending substantially perpendicular to said line of intersection of said planar support surfaces, wherein at least one said socket formation comprises two retention means for allowing an inserted rod or tube to be locked at a selected angle of tilt.

21. A connector according to claim 20, wherein said two retention means are provided at positions in the axially outer half of the length of the socket formation.

22. A connector according to claim 1, wherein a bore of one said socket formation increases, as considered in an inwards direction from said outer end to said inner end region, thereby to allow a variation of an angle of tilt of an inserted rod or tube.

23. A connector according to claim 1, wherein a bore of one said socket formation, at a position inwards from said outer end, has a dimension that equals a corresponding dimension at said outer end as considered in a first direction parallel to the line of intersection of said support surfaces, and has an increased dimension perpendicular to the first direction, whereby an inserted rod or tube of circular cross section may tilt about the line of intersection and not about an axis perpendicular to the line of intersection.

24. A connector for a safety rail assembly, said connector comprising a unitary casting comprising a body portion and a pair of socket formations, said body portion comprising first and second flange formations which each define a substantially planar support surface and said support surfaces lying relative to one another in an 'L' shape configuration at an included angle of 70° to 95° as viewed in the direction of the line of intersection of said planar support surfaces, said support surfaces facing outwardly, and opposite inwardly facing surfaces of the flange formations each having integral therewith a respective one of said socket formations, each said socket formation having an outer end for receiving an end of a tube or rod and an inner end region which is integral with the inner end region of the other socket formation of the pair, the longitudinal axis of each said socket formation extending substantially perpendicular to the line of intersection of said planar support surfaces, and each said socket formation having a non-circular bore at the inner end region, the bore having a cross sectional dimension at the inner end region, as considered in a direction parallel to the line of intersection, that is equal to the corresponding dimension at the outer end.

* * * * *